United States Patent Office 3,564,073
Patented Feb. 16, 1971

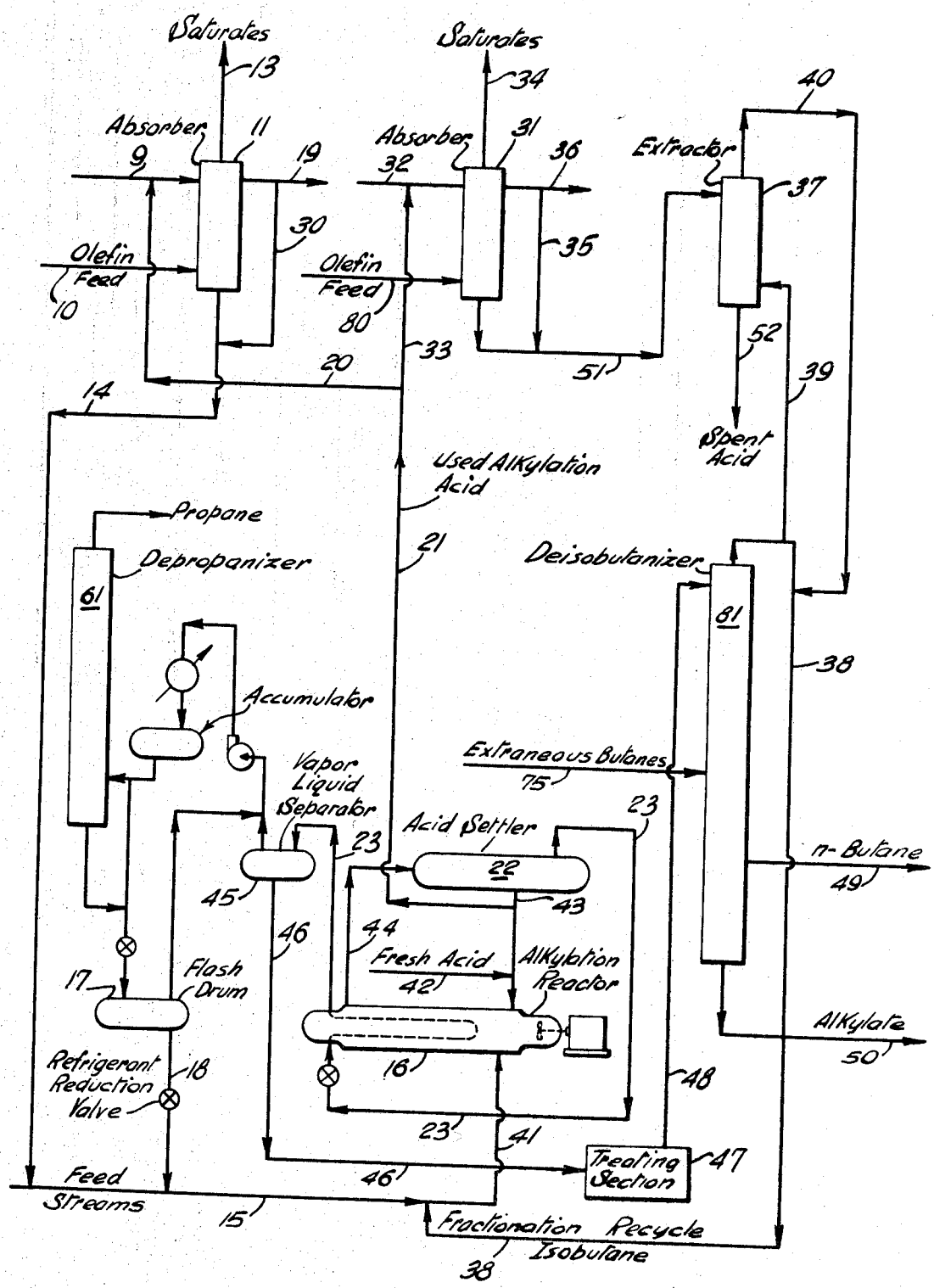

3,564,073
MULTIPLE ABSORPTION ZONES FOR ACID RECOVERY IN ALKYLATION
Arthur R. Goldsby, Chappaqua, N.Y., assignor to Texaco Development Corporation, a corporation of Delaware
Continuation-in-part of applications Ser. No. 510,904, Dec. 1, 1965, and Ser. No. 516,448, Dec. 27, 1965, both which are continuations-in-part of application Ser. No. 386,486, July 28, 1964, now Patent No. 3,234,301, which is a continuation-in-part of application Ser. No. 50,161, Aug. 17, 1960. This application June 1, 1967, Ser. No. 642,739
Int. Cl. C07c *3/54*
U.S. Cl. 260—683.62       5 Claims

ABSTRACT OF THE DISCLOSURE

This invention and this disclosure relate to a process using a sulfuric acid catalyst for the alkylation of isobutane with an olefin to give a low catalyst consumption and a reduced amount of conventional fractionation. Olefin is removed from an olefin feed containing inerts by absorption in used sulfuric alkylation acid. The inerts are discharged from the system prior to alkylation and the acid containing absorbed olefins is charged to alkylation. Olefin is reacted with another portion of used alkylation acid containing alkylation contaminants to form alkyl sulfates. The alkyl sulfates are extracted from the alkylation contaminants with isobutane and charged to alkylation.

CROSS REFERENCE TO RELATED APPLICATIONS

This application is a continuation-in-part of application Ser. No. 510,904 filed Dec. 1, 1965 and application Ser. No. 516,448 filed Dec. 27, 1965 both of which are now abandoned and continuation-in-part applications of the copending application Ser. No. 386,486 filed July 28, 1964 now U.S. Pat. 3,234,301 which was a continuation in part of Ser. No. 50,161 filed Aug. 17, 1960 now abandoned.

BACKGROUND OF THE INVENTION

Field of the invention

This invention resides in the alkylation field and more particularly in the field of alkylation of isoparaffins with olefins employing sulfuric acid as a catalyst. Still more specifically, this invention resides in the field in which the sulfuric acid catalyst employed in the alkylation process is passed through subsequent treating steps to remove therefrom alkylation contaminants in the form of water and conjugated polymers and the like to render the used sulfuric acid useful for recycle in the form of the acid or in the form of an olefin ester to the alkylation zone. Such a process substantially cuts down on the amount of spent acid catalyst rejected from the system and the amount of fresh acid required as make-up acid.

Description of the prior art

The above alkylation process and its sulfuric acid recovery phase are broadly old and discussed in the above mentioned copending applications and in the above cited patents. Generally speaking, the olefin feed stream, heretofore, had to have a relatively high olefin content, a relatively low inert content, and be substantially free of non-condensibles for employment in the manner of the processes described. Hence, those feed streams present in a refinery which are low in olefin content have heretofore been considered to be inapplicable for use in the alkylation-acid recovery process. Such a feed stream would be the unreacted effluent from the polymerization reactors containing a small quentity e.g. about 20% by weight propylene or the like. Hence, it became very desirable to provide a combined alkylation-acid recovery process which could utilize a feed stream low in olefin content and high in inert hydrocarbon content. Even the olefin feed streams usually used have such a high content of inerts, such as propane and n-butane, in them that an appreciable cost is involved in removing the inerts from the alkylate product.

SUMMARY OF THE INVENTION

Objects of the invention

It is an object of this invention, therefore, to provide a combined alkylation-acid recovery process which can be run economically employing the sulfuric acid catalyst by recycling it after removal of the alkylation contaminants.

It is another object of this invention, therefore, to provide the combined alkylation acid recovery process which utilizes effectively a feed stream low in olefin content.

It is still another object of this invention, therefore, to provide such a combined acid recovery process in which used sulfuric acid catalyst from the alkylation zone is employed effectively to form olefin ester with the olefin in the feed stream and remove inerts from it.

These and other objects of this invention will become apparent from the following more complete description of my invention, accompanying drawing and appended claims.

Statement of the invention

This invention relates to an improvement in a process wherein an isoparaffin e.g. isobutane is alkylated with an olefin e.g. propylene in the presence of a sulfuric acid catalyst in an alkylation zone containing a reaction mixture maintained in liquid phase comprising a hydrocarbon and acid emulsion of reactants wherein the catalyst becomes contaminated with alkylation contaminants, and emulsion effluent is separated into an acid phase containing alkylation contaminants and a hydrocarbon phase. The improvement resides in passing a portion of the separated acid phase to a first absorption zone in which said acid phase is contacted with a hydrocarbon stream comprising olefin and inerts thereby effecting reaction of said olefin with said acid phase forming a first reaction product, separating from said reaction product inerts and passing remaining liquid reaction product comprising acid and absorbed olefin to the alkylation reaction zone. Another portion of the separated acid phase containing alkylation contaminants is passed to a second absorption zone in which the acid phase is contacted with a hydrocarbon stream comprising olefin thereby effecting reaction of the olefin with the acid phase forming the second absorption reaction product, separating the second absorption reaction product into an acid phase containing at least part of the alkylation contaminants, and an organic phase comprising alkyl sulfates, and passing the organic phase to the alkylation reaction zone.

DISCUSSION OF A PREFERRED EMBODIMENT

With the invention of my improved acid recovery process it is possible to get almost as low net acid consumption, and at the same time to use charge stocks which could not be used in conventional alkylation, and to reduce greatly the inerts in the alkylation section, and thereby greatly reduce the amount of conventional fractionation required. In my invention a part of the olefin feed associated with inerts is processed in the absorber of the recovery section with used alkylation acid containing alkylation contaminants, such as conjugated cyclic dienes and water. The olefin is reacted with used alkylation acid to form alkyl sulfates. The sulfates are selectively extracted and the alkylation contaminants eliminated. The alkyl sulfates are alkylated and 100 percent sulfuric acid is regenerated to supply part of the system catalyst. In another absorber the rest of the olefin feed or at least a portion associated with inerts is reacted with used sulfuric acid from alkylation under conditions to minimize the formation of alkylation contaminants and to maximize the elimination of inerts. The absorption mixture of acid and olefins with most of the inerts eliminated either in the absorption step or subsequently is also alkylated. Thus, substantially all of the inerts which would normally have to be charged to alkylation along with the olefin feed are eliminated before they get into the alkylation section.

Some of the major advantages of my invention are that it enables lower cost alkylation feed stocks to be used, and in some cases stocks which could not be used in conventional alkylation, inerts in the alkylation system are reduced with a resulting reduction in capital and operating costs for fractionation, the isobutane concentration in the alkylation reaction mixture is increased with a resulting improvement in quality of alkylate product, and there is a big decrease in the refrigeration required for the alkylation section.

Having set forth the general nature of the invention, it will be best understood from the more detailed description and accompanying drawing. Although the drawing illustrates a general arrangement of apparatus in which the process of this invention can be practiced, it is not intended to limit the invention to the particular apparatus or materials described. It can be applied to other contacting devices for the absorbers and to other alkylation systems, for example, those using cascade autorefrigeration and emulsion flashing.

In the accompanying drawing, forming a part of this specification, the invention is shown as applied to an alkylation unit using effluent refrigeration.

Referring to the accompanying drawing, an olefin stream in the gaseous phase comprising ethylene, propylene and butylenes in admixture with saturated hydrocarbons is passed through line 10 to absorber 11 near the bottom. Gas is contacted countercurrently with descending used sulfuric alkylation acid introduced into absorber 11 near the top through lines 9, 20, 21 and 43 from alkylation acid settler 22. The sulfuric acid absorbs propylene and butylenes forming the corresponding esters, and the remaining gases containing ethylene and saturated hydrocarbons are discharged from the top of absorber 11 through line 13.

The acidic lower phase comprising alkyl sulfates is passed through lines 14, 15 and 41 to alkylation reactor 16. If desired the acidic phase can be introduced directly to reactor 16 by a line not shown. If the acidic phase should contain more material conducive to poor alkylation results than desired, such as propane and ethylene, it can be introduced advantageously to a flashing step, and in some cases to flash drum 17, to remove such materials, and then the remaining material passed to alkylation reactor 16 via lines 18, 15 and 41. Any liquid polymer which forms in absorber 11 and collects as a separate hydrocarbon layer on top of the acid phase, or is separated from the gas leaving absorber 11 by line 13, may be advantageously passed to alkylation reactor 16, especially the dimers, through lines 19, 30, 14, 15 and 41, or can be removed from the system for other uses, such as for use in motor fuel after separation from dissolved alkyl sulfates.

An olefin stream comprising ethylene, propylene and butylenes in admixture with saturated hydrocarbons is introduced in the liquid phase to absorber 31 through line 80. Used sulfuric acid is introduced to absorber 31 near the top through lines 32, 33, 21, and 43 from alkylation acid settler 22. As in the case of absorber 11, the used sulfuric acid absorbs propylene and butylenes forming the corresponding esters, and the remaining gases are discharged from absorber 31 through line 34. The acidic lower phase comprising alkyl sulfates is passed to extractor 37 through line 51. Any polymer which forms in absorber 31 and collects as a separate hydrocarbon layer on top of the acid phase can be discharged from the system through line 36, or advantageously be passed to extractor 37 through lines 35 and 51, as it will contain dissolved alkyl sulfates, or passed to alkylation reactor 16 via lines 36 and additional lines not shown. Isobutane is also introduced to extractor 37. This can be refrigerant recycle isobutane from flash drum 17 at about 18° F., or as shown, from deisobutanizer 81 through lines 38 and 39.

Spent acid or raffinate comprising acid-oil complex and water is discharged from the bottom of extractor 37 through line 52. Extractor organic phase comprising isobutane and alkyl sulfates is passed to alkylation reactor 16 through lines 40, 38, 15 and 41.

In addition to the alkyl sulfates and isobutane substantially free of n-paraffins which are charged to alkylation reactor 16 from absorber 11 and extractor 37, additional isobutane through lines 38, 15 and 41, olefin through lines 15 and 41, fresh acid through lines 42 and 43, and recycle acid or emulsion through line 43, are introduced into alkylation reactor 16.

Alkylation reaction mixture is passed through line 44 to settler 22. Hydrocarbon comprising isobutane and alkylate are separated from acid in acid settler 22 and removed in line 23. After passing through indirect heat exchange in reactor 16 and vapor-liquid separator 45, liquid is passed to treating section 47 by line 46 and then to deisobutanizer 81 by line 48.

Isobutane is taken off the top of tower 81 and passed through lines 38, 15 and 41 to alkylation reactor 16 and to extractor 37 through lines 38 and 39. n-Butane is taken off as a side stream through line 49 from deisobutanizer 81. Alkylate is discharged from the bottom of deisobutanizer 81 through line 50.

Although an isostripper type fractionator 81 is shown in which reflux is furnished by introducing the fresh feed containing alkylate near the top of the tower, other conventional fractionation schemes may be used. A depropanizer 61 is used in conjunction with the rest of the fractionation equipment to discharge propane from the system, although most of it is or can be eliminated from the absorbers 11 and 31, as described.

EXAMPLE

A charge stock identified as fluid catalytic cracking absorber tail gas with the following composition is charged in the vapor phase near the bottom of a counter-current first absorber at a rate of about 1150 barrels per day of of propylene and butylenes sufficient to make when alkylated with isobutane 1800 barrels per day of alkylate:

|  | Mole percent |
|---|---|
| Non-condensibles | 15.6 |
| Hydrogen sulfide | 1.5 |
| Hydrogen | 19.7 |
| Methane | 33.6 |
| Ethylene | 8.6 |
| Ethane | 15.5 |
| Propylene | 2.2 |
| Propane | 1.8 |
| Isobutane | 0.5 |
| Butylenes | 0.4 |
| n-Butane | 0.3 |
| Pentanes+ | 0.3 |
| Total | 100.0 |

The absorber is held at about 15 p.s.i.g. and a temperature gradient of 0–30° F., with the lower temperature being near the bottom of the tower. Used alkylation acid of about 88.0 percent concentration is charged near the top of the tower. Substantially all of the ethane and lighter is discharged from the top of the tower as a vapor. Approximately 90 percent of the propylene and butylenes is absorbed in the acid as alkyl sulfates. Acid from the bottom of the tower containing alkyl sulfates and alkylation contaminants is charged to the first reactor in an alkylation reactor system with two reactors being operated with series flow of the acid and with parallel flow for the hydrocarbon.

A portion of the same hydrocarbon charge stock is charged near the bottom of a second countercurrent absorber with essentially the same temperature and pressure conditions as in the first absorber at a rate of about 510 barrels per day of propylene and butylenes, or sufficient to make when alkylated with isobutane 800 barrels per day of alkylate.

Used sulfuric alkylation acid titrating about 88.0 percent and containing alkylation contaminants is charged near the top of the tower. Substantially all of the ethane and lighter is discharged from the top of the tower as a vapor. Approximately 90 percent of the propylene and butylenes is absorbed in the acid with conversion of nearly all of the available acid to dialkyl sulfates.

The acidic material containing dialkyl sulfates and alkylation contaminants is charged to a countercurrent extraction tower near the top. Isobutane is charged to the the tower near the bottom in an amount of about 10 mols per mol of dialkyl sulfate. Raffinate or spent acid containing most of the alkylation contaminants including water contained in the charge acid is discharged from the system. The isobutane extract comprising dialkyl sulfate and essentially free of alkylation contaminants is charged to the same first alkylation reactor as the acid phase from the bottom of the first absorber 11. Additional isobutane and 25,200 pounds per day of fresh 99.5 percent sulfuric acid are also charged to the first alkylation reactor. The emulsion reaction mixture is separated into an acid phase or acid rich phase and a hydrocarbon phase. The hydrocarbon phase is processed for isolation of the alkylate product. The acid phase titrating about 93 percent is passed to the second alkylation reactor along with isobutane and 1370 barrels per day of butane-butylenes containing 60 percent of butylenes. The acidity of the acid in the second reactor is reduced to about 88 percent. As in the case of the first reactor, the reaction mixture from the second reactor is separated into an acid phase and a hydrocarbon phase. The hydrocarbon phase is processed for isolation of the alkylate product.

The total production of debutanized alkylate is approximately 4,000 barrels per day, and the acid consumption 0.15 pound per gallon of alkylate.

The key feature of this invention is the elimination of inerts from alkylation charge stocks before they get into the alkylation system, and with the production of alkylate with a low net acid consumption. This requires or enables one to process more olefin feed stock for the purpose of eliminating inerts than is required to recover the used sulfuric acid or to convert it to dialkyl sulfate. Thus, one portion of the olefin feed is reacted with used alkylation sulfuric acid primarily to eliminate inerts and another portion is reacted with used alkylation sulfuric acid to eliminate alkylation contaminants and to recover sulfuric acid.

Although the two operations designed primarily to eliminate inerts and to eliminate alkylation contaminants involve the same chemical reactions, they are advantageously carried out quite differently but cooperatively with each other and also cooperatively with the alkylation operation to produce superior results which could not be obtained otherwise.

In the example given, the absorber tail gas cannot be processed in conventional alkylation units because of the non-condensibles and the low percentage of olefin present. And in a unit using the acid recovery process without the present invention, only a relatively small amount of olefin could be used, or is needed, in the acid recovery section, representing perhaps 10 to 20% of the total olefin. In the example given approximately 65 percent of the total olefin is absorber tail gas. If desired this could be increased to as much as 80 to 90 percent. However, in general the alkylation results are better, particularly in relation to acid consumption or amount of acid sent to the recovery system, as more butylenes are used in relation to propylene, especially when up to about 35% of the total olefins is butylenes. If no propylene is used, and only butylenes are used, all of the olefin can be charged to the absorber with elimination of inerts.

In treating olefin-containing feed with used sulfuric alkylation acid to remove inerts, and to form selectively the diester, several different approaches can be used. As shown in the drawing, the reaction can be conducted under vapor phase conditions such that the inerts can be removed as a vapor and the olefin held by the acid. The olefin feed can be charged either as a liquid or a vapor. Alternatively, a reactor can be used, such as those used in cascade autorefrigerated alkylation units, under conditions such that the lighter materials, including of course the non-condensibles, will be removed from the reactor, and the heavier materials, such as part of the butanes and heavier will remain in the reactor in the liquid phase. If the stocks contain non-condensibles, the non-condensibles must be removed substantially as fast as charged. After the reaction of the olefin with the acid, the condensible inerts, in liquid phase operation can be removed from the product in a number of ways, such as by a separate flashing step on the product, or by passing the reaction product in indirect heat exchange at low pressure with the exothermic reacting mixture of olefin and acid in the absorber.

When operating the absorber under vapor phase conditions, additional or extraneous saturated paraffin, such as propane or n-butane can be introduced to the absorber in the liquid phase to give additional cooling by flashing, if required.

Approximately one half of the heat of reaction of the alkylation of an olefin with isobutane using a sulfuric acid catalyst takes place in the absorption of the olefin in the acid. Therefore, in the described invention to the extent that the olefin feed is absorbed in the two absorbers a corresponding amount of heat of reaction takes place in the absorbers rather than in the alkylation reactor. This means that less cooling is required in the alkylation reactor, and this enables less expensive and less efficient alkylation reactors to be used.

First absorber

The purpose of the first absorber is to eliminate inerts and ethylene, and to absorb or to recover olefins such as propylene and butylenes from charge stocks. Subsequently, the recovered olefins are alkylated along with olefins or alkyl sulfates from which alkylation contaminants have been eliminated. It is important that the absorber be operated under conditions to minimize conjunct polymerization and formation of acid-polymeric oil complex.

A propylene containing stock is the preferred charge stock as propylene is usually associated with an appreciable quantity of inerts, and in some cases to an extent to make it unsuitable for alkylation. Butylene stocks can also be used. Those high in inerts such as the effluent gas from a polymerization unit are of particular interest. These streams are preferred because the instant invention makes substantial economical use of these streams which heretofore required several treatments to convert them into a good feed stream.

The first absorber can be operated so as to react varying amounts of olefin with the used alkylation acid charged to it. Thus, less than one mol of olefin may be reacted per mol of available acid giving a product comprising largely alkyl acid sulfate and unreacted acid, one mol or a little more of olefin per mol of acid giving a product comprising largely alkyl acid sulfate, a smaller amount of dialkyl sulfate and very little if any unreacted acid, or two mols of olefin per mol of acid giving a product comprising largely dialkyl sulfate, a small amount of alkyl acid sulfate and again very little, if any, unreacted acid. Since the inerts are associated with olefins, the more olefin which is reacted with the acid, the more inerts which may be eliminated from the charge stock and product. Thus from a consideration of inerts elimination, a full two moles or even an excess of olefin are preferred. However, a small amount of acid-oil complex is also formed by conjunct polymerization when the olefin reacts with the acid, so the acid-oil complex production must be taken into consideration also, since the complex is carried on into the alkylation system and is not eliminated from the overall system until it is charged as a part of the used alkylation acid to the second absorber, whose product is extracted with isobutane to eliminate acid-oil complex and water. One other consideration is that less acid needs to be recycled to the absorber from alkylation as more olefin is reacted, and in general this is desirable. However, since it is difficult to react all of the acid to dialkyl sulfate, it usually would be advantageous to react somewhat less than two mols of olefin per mol of acid.

As indicated earlier the first absorber may be operated under vapor phase conditions, or under liquid phase conditions followed by elimination of inerts before charging the product to alkylation.

Used sulfuric alkylation acid is the only acid of interest from an economical standpoint for the first absorber, although fresh sulfuric acid of the strength used for alkylation can also be employed. The used alkylation acid should be at least as strong as minimum alkylation strength acid and will usually be in the range of 88 to 93%, but can be a little lower or higher in concentration. Usually it would be the spent alkylation acid of lowest concentration in a unit, although in certain cases in order to make more acid available, a higher concentration acid in an alkylation unit with at least two reactors operated in series on the acid could be used. This is not essential as more acid of discharge strength may be made available by using a high percentage volume of acid in the alkylation reactor, for example 60 to 75 percent or higher instead of the usual 40–60 percent.

In general, a short residence time and low temperature are conducive to good results in the absorber, although other factors have a considerable bearing on these variables. The efficiency of contacting olefin with acid is of course very important, especially in the vapor phase. Butylene stocks and especially isobutylene containing stocks require a lower temperature than propylene. Fresh make-up alkylation acid of 98.0 to 99.5 percent concentration or used alkylation acid of about 90 percent concentration requires milder conditions, such as a lower temperature, than such acids containing an appreciable percentage of alkyl sulfates. Residence times as short as a fraction of a second can be used if a propylene or butylene stock is passed in vapor phase to an efficient contacting device like a rotating flash evaporator in which the olefin meets a thin film of acid with an acid to olefin weight ratio of 50 to 100. On the other hand, a residence time as long as an hour or more can be used in a packed countercurrent tower by venting inerts in vapor phase and recycling liquid reaction mixture from near the bottom of the tower to about half way up or higher in the tower. A temperature range of 30–50° is satisfactory for propylene although less conjunct polymer will usually be formed at even low temperatures. For n-butylene stocks, a temperature of 20–40° is preferred, and with isobutylene-containing stocks, a temperature as low as 0–20° is preferred. For isobutylene-containing stocks, a temperature gradient may be used with the lowest temperature, for example, in a countercurrent tower, being in the bottom of the tower where the fresh olefin containing isobutylene meets the acid.

The absorption step can be effected in contacting equipment well known in the art, for example, mixer settlers, centrifugal contactors, countercurrent towers, such as packed towers or bubble cap towers, or two or more mechanically stirred reactors, preferably operated to give countercurrent flow. When it is desired to obtain a high conversion of the acid to dialkyl sulfates, multi-stage countercurrent contacting is preferred. Countercurrent contacting is also preferred when little if any excess of olefin is used, or complete reaction of the olefin is desired.

Although not a great deal of inerts remains dissolved in the liquid product from the absorber, if desired, the inerts can be removed, for example, by reducing the pressure on the liquid product and carefully heating to maintain a boiling temperature.

Cooling of the absorber can be done by conventional means, such as by cooling of the hydrocarbon and especially the acid charge stock, or by indirect heat exchange, or by injection of a vaporizable liquid such as propane or butane and allowing it to vaporize.

In some cases, the feed to the first absorber can contain enough isobutane so that it will be desired to recover the isobutane from the absorber effluent containing the inerts for alkylation. This can be done by charging the effluent to the alkylation fractionation system, such as to the depropanizer or deisobutanizer. It is advantageous to operate in this manner rather than to charge the olefin feed containing the isobutane and inerts directly to alkylation, since by this method the inerts do not enter the alkylation reaction zone. Thus, desirable isobutane is made available for alkylation and with the major portion of the inerts eliminated. The net effect is to have a higher concentration of isobutane and a lower concentration of inerts, such as propane and n-butane, in the alkylation zone, thereby resulting in a lower catalyst consumption and a higher octane alkylate.

Second absorber

The main purpose of the second absorber or acid recovery absorber is to convert as much as possible of the available acid to extractable sulfates, e.g. dialkyl sulfate for subsequent extraction of the dialkyl sulfates with the elimination of alkylation contaminants. It can also be used to eliminate inerts, but this is secondary to forming a high percentage of extractable sulfates and elimination of alkylation contaminants. As in the first absorber, it is also important to minimize conjunct polymerization or the formation of acid-polymeric oil complex which comprises part of the alkylation contaminants.

Propylene is the preferred charge stock, although other olefins can be used, especially the higher olefin, butylenes and the amylenes, and especially n-butylenes, and even higher molecular weight olefins.

The absorption can be carried out in either vapor or liquid phase, or in a combination of the two. For example, part of the absorption can be carried out in the vapor phase, followed by liquid phase for the final portion of the absorption step for a high conversion of the acid to dialkyl sulfates. Part of the cooling in the absorption step can be effected, if desired, by introducing all or a part of charge in liquid phase and allowing it to vaporize by the heat of reaction in the absorber. Some of the cooling can also be effected by using charge streams to the absorber cooled to a temperature below the absorber reaction temperature, for example, the used acid from an operation employing emulsion flashing or flashing of alkylation reaction mixture for controlling the temperature of the alkylation reactor.

Used alkylation acid having a titratable acidity of 88–93% by weight is the preferred acid charge stock for the absorption step, although in some cases, for example, if amylenes are being alkylated, it can have a concentration as low as 80–85%. Acid from other sources, such as fresh acid, or acid from chemical reactions, and acid from the acid treatment of petroleum naphtha or lube oil can also be used if they contain available sulfuric acid which will react with olefin.

When using strong acid with propylene, a temperature of 20–60° F. is satisfactory. When butylenes are used, especially isobutylene or isobutylene containing charge stocks, quite low temperatures and short times are advantageous.

Relative concentrated olefin stocks such as those from catalytic cracking are preferred, although from a cost standpoint lean stocks, such as lean propylene stock having only a value of fuel, are advantageous and are satisfactory.

The same type of equipment discussed for the first absorber is suitable for the second absorber. Multi-stage countercurrent contacting is preferred in order to obtain a high conversion of the acid to dialkyl sulfates, and in most cases for a high conversion of the olefins.

Stocks such as absorber tail gas or polymerization charge or effluent gas will usually contain an appreciable amount of ethylene, as well as inerts. It is well known that ethylene is harmful to alkylation in that it causes an increase in the acid consumption. Thus, ethylene could be an important factor in the invention in question. There are a number of ways in which it may be handled, or there are a number of possibilities to indicate that it is not harmful in the process of the invention. The most effective means of handling it is to run the first absorber, as well as the second absorber, under conditions such that the ethylene will not react with the acid and, thus it will be eliminated along with the inerts and will not be charged to alkylation. In any case, the ethylene-containing stocks have a low partial pressure of ethylene with the result that not much of the ethylene reacts with the acid. This will be especially true if conditions are chosen to favor ethylene passing through the absorber unreacted, for example, by using vapor phase, a short residence time, low temperature, low partial pressure of ethylene and acid diluted with alkyl sulfates. If ethylene does react to form ethyl acid sulfate or diethylsulfate, it can be eliminated as raffinate or spent acid from the extractor after is goes through the alkylation reactor and the second absorber. With certain stocks, in view of the high concentration of propylene and butylene in relation to the ethylene, at least part of the ethylene is converted to mixed sulfates, such as ethylpropyl sulfate or ethylbutyl sulfate, if dialkyl sulfates are formed.

As indicated earlier, especially when using propylene and butylene feeds, I prefer to carry out the absorption under conditions to get a high concentration of dialkyl sulfates and in general as high a concentration as possible. However, when using higher molecular weight olefins in some cases it is advantageous to carry out the absorption so as to give a product of alkyl sulfates predominantly the mono rather than the di, or predominantly alkyl acid sulfates.

Extraction of second absorber reaction product

In general, reasonably low temperatures and reasonably short times are preferred for the hydrocarbon extraction of the absorber acid phase reaction product. For example, a temperature range of 30–60° F. with a few minutes residence time is satisfactory. However, reasonably good results have been obtained at ambient temperatures as high as 85–100° F. The conditions will depend somewhat upon the absorption product and the olefin used for the absorption step.

The extraction step may be effected in equipment known in the art, for example, mixer-settlers, centrifugal contactors or countercurrent towers, for example, a Rotating Disc Contactor.

The separation of the dialkyl sulfates from the acid-oil reaction product and water can be made in a variety of ways, as disclosed in my U.S. 3,227,774 of Jan. 4, 1966 entitled "Sulfuric Alkylation Acid Recovery." For example, the absorber reaction mixture can be diluted with a large quantity of water, extracted with a hydrocarbon, such as isobutane, or a hydrocarbon solution may be chilled.

In general it is easier to extract the dialkyl sulfate than the alkyl acid sulfate. Thus, it is desirable to use quite good and efficient conditions in the extraction step so as to extract not only the dialkyl sulfate, but also the alkyl acid sulfate. Such conditions include a high solvent dosage on the order of six mols per mol of alkyl sulfate, or higher, raffinate recycle, multi-stage countercurrent extraction, and optimum charge rate for a given extraction vessel. The ease of extraction of the dialkyl sulfates and also the alkyl acid sulfates increases with molecular weight of the alkyl group. Thus, the methyl sulfates are the most difficult to extract and the butyl and amyl sulfates are easier to extract than the propyl sulfates.

The raffinate or spent acid from the extraction step will comprise water, alkyl acid sulfate, dialkyl sulfate and the reaction product of acid and polymeric oil formed during the alkylation, absorption, and acid treating steps. The extract comprises the hydrocarbon solvent, dialkyl sulfate, and alkyl acid sulfate.

It is the objective to approach as nearly as possible only acid-oil reaction product and water in the spent acid or raffinate, with all of the alkyl sulfates in the extract or organic phase.

Any polymer oil contaminant in the extractor extract is quite unsaturated and it reacts readily with strong sulfuric acid, such as fresh make-up acid used for the alkylation step, or used alkylation acid of about 90% concentration. Thus, if desired, the absorber-extract can be acid treated prior to charging it to alkylation to remove the oil, and optionally, after removal of any excess unreacted olefin. For example, quite good results have been obtained by acid treating polymeric oil in isobutane solution with used alkylation acid of about 90% concentration at a temperature of 85° F. and a time as long as one hour. However, a temperature not over about 40–60° F. and a short time on the order of a few minutes or less are preferred. Actually a very short time such as would be obtained in the mixing with a pressure drop orifice appears to be satisfactory.

Alkylation

In general, the conditions for the alkllation step are those which are well known in the art. However, the bulk of the make-up acid is charged to alkylation as alkyl sulfates which result from the recovery section, and only a minor proportion of the acid is charged as the fresh make-up acid of the usual 98–99.5% concentration. Since the alkyl sulfates are substantially water free, the trend is for the system catalyst, when using the acid recovery process, to be of lower water content and, in general, of superior quality in that a lower end point alkylate of higher octane value is obtained. Of course, if desired, less drying of charge stocks may be used, and in such a case the water content of the system catalyst could be as high as in conventional operation without acid recovery. The sulfuric acid in the alkylation system is usually maintained within a range of about 88–95% by purging spent acid from the system. In a multiple reactor system, the acid of the lowest concentration should be purged and sent to the acid recovery system.

A large excess of isobutane is used, for example, as much as 60–80 volume percent of the hydrocarbons in the alkylation reaction mixture. Consequently, a large quantity of isobutane must be recovered and recycled for reuse in the alkylation process. It is also available for the acid recovery process as described.

In addition to the olefin which is charged to the alkylation step in the form of alkyl sulfates, additional fresh olefin is usually charged to the alkylation step. For example, when propylene and/or butylenes, and especially propylene, are used for the absorption step, it is advantageous to use butylenes also in the alkylation step. In a multiple reactor alkylation unit using series acid flow it is advantageous to have a high percentage of butylenes in relation to propylene in the last or final reactor with the lowest acid concentration, as disclosed in my U.S. 3,234,301, of July 28, 1964, entitled, "Sulfuric Acid Recovery Process."

In general, quite good alkylation conditions are preferred when this invention is used if a minimum acid consumption is desired. The good alkylation conditions include efficient mixing, recycle of wild acid or emulsion from the the settler to the reactor, high isobutane concentration in the hydrocarbon reaction mixture, low temperature, and a high percentage of butylenes in relation to propylene. However, the acid consumption is still almost as low and the process quite attractive even when rather poor conditions are used for alkylation.

There are many different specific ways in which my invention may be used, for example, because of existing conditions or because of charge stocks, especially when used in combination with alkylation when more than one alkylation unit or reactor is operated, as exemplified by but not limited to the following with two alkylation units, A and B and recovery unit R.

(1) Used acid from A and B is charged to R and recovered acid from R is charged only to B.

(2) Used acid from A is charged to R and used acid from B is charged to A and recovered acid from R is charged to B.

(3) Used acid from A is charged to B and used acid from B is charged to R, and recovered acid from R is charged to A.

(4) Used acid from A and B is charged to R, and recovered acid from R is charged to A and B.

(5) When applied to two alkylation reactors A and B (rather than to two alkylation units A and B) operated in series on acid with a single settler for both reactors, used acid from A is charged to B, used acid from B is charged to R, and recovered acid from R is charged to A. In principle this is the same as (2) above. It is the same principle also as in a multi reaction zone reactor such as in a cascade reactor with series flow of hydrocarbon and emulsion with only a final settler, or in a multiple reactor unit with parallel flow of hydrocarbon and emulsion with a settler for each reactor or pair of reactors.

In any of the above general modifications a part of the acid sent to recovery R may be from another source, including non-alkylation sources, and not from sources A and B.

I claim:

1. In an alkylation process wherein an isoparaffin is alkylated with an olefin in the presence of a sulfuric acid catalyst in an alkylation reaction zone containing a reaction mixture in liquid phase comprising a hydrocarbon and acid emulsion of reactants wherein said catalyst becomes contaminated with alkylation contaminants, and emulsion effluent comprising a part of said reaction mixture is withdrawn from said reaction zone, and at least a portion of said emulsion effluent is separated into an acid phase containing alkylation contaminants and a hydrocarbon phase, the improvement which comprises:

passing a first portion of said separated acid phase to a first absorption zone in which said first portion of said acid phase is reacted with a first hydrocarbon feed stream comprising alkylatable olefins, propylene and butylenes in admixture with non-alkylatable hydrocarbons forming a first absorption liquid reaction product comprising alkyl sulfates, unreacted sulfuric acid, polymer and alkylation contaminants and a first absorption gaseous product comprising gaseous non-alkylatable hydrocarbons, said reaction being carried out with less than two moles of olefin per mole of acid to substantial completion with minimal formation of acid oil complex, removing from said first absorption zone said first absorption gaseous product, passing said first absorption liquid reaction product to said alkylation reaction zone, passing a second portion of said separated acid phase to a second absorption zone in which said second portion of said separated acid phase is reacted with a second hydrocarbon feed stream comprising ethylene, propylene and butylenes in admixture with saturated hydrocarbons such that the amount of propylene and butylenes is in excess of the amount required to convert all of the acid in said acid phase to dialkyl sulfates and forming a second absorption liquid reaction product containing a high yield of dialkyl sulfates, separating said second absorption reaction product by extraction with isobutane solvent into an acidic phase comprising alkylation contaminants, and an isobutane-dialkyl sulfate extract phase, and discarding said acidic phase, and passing said isobutane-dialkyl sulfate extract phase to said alkylation reaction zone.

2. The process of claim 1 in which the quantity of said first hydrocarbon feed charged to said first absorption zone is of the order of at least two times the quantity of said second hydrocarbon feed charged to said second absorption zone.

3. The process of claim 1 in which said first hydrocarbon feed and said second hydrocarbon feed contain less than about 20% by weight of alkylatable olefin and more than about 80% by weight of inerts.

4. The process of claim 1 in which the temperature and pressure in said first absorption zone are adjusted for continuous vaporization and removal of said first absorption gaseous product substantially as fast as charged to said first absorption zone.

5. In an alkylation process wherein an isoparaffin is alkylated with an olefin in the presence of a sulfuric acid catalyst in an alkylation reaction zone containing a reaction mixture maintained in liquid phase comprising a hydrocarbon and acid emulsion of reactants wherein said catalyst becomes contaminated with alkylation contaminants and emulsion effluent comprising a part of said reaction mixture is withdrawn from said reaction zone, and at least a portion of said emulsion effluent is separated into a used acid phase containing alkylation contaminants and a hydrocarbon product phase, and the hydrocarbon product phase is passed to fractionation means for separating alkylate, isobutane and n-butane, the improvement which comprises:

passing a first portion of said separated used acid phase to a first absorption zone in which said first portion of said used acid phase is reacted with a first hydrocarbon stream comprising isobutane, butylenes and inerts forming a first absorption acid phase comprising alkyl sulfates, unreacted sulfuric acid and alkylation contaminants, and a gaseous absorption hydrocarbon phase comprising isobutane and inerts, said reaction being carried out with less than two moles of butylenes per mole of acid to substantial completion with minimal formation of acid-oil complex, removing said gaseous absorption hydrocarbon phase from said first absorption acid phase, passing a second portion of said separated used acid phase to a second absorption zone wherein said used acid phase is reacted with a hydrocarbon stream containing an excess of olefin in an amount over that required to convert all of the acid in said used acid phase to dialkyl sulfate forming a second absorption acid phase containing a high yield of dialkyl sulfate, separating said second absorption acid phase by extraction with isobutane into a raffinate acidic phase comprising alkylation contaminants, and an extract solution of dialkyl sulfate in isobutane solvent, discarding said raffinate acidic phase, and passing said first absorption acid phase, said extract solution of dialkyl sulfate in isobutane solvent to said alkylation reaction zone.

References Cited

UNITED STATES PATENTS

| | | | |
|---|---|---|---|
| 2,320,336 | 6/1943 | Bruner et al. | 260—683.61 |
| 3,227,775 | 1/1966 | Goldsby | 260—683.61 |
| 2,511,810 | 6/1950 | Arnold | 260—683.61 |
| 3,007,983 | 11/1961 | Clauson | 260—683.61 |
| 3,234,301 | 2/1966 | Goldsby (II) | 260—683.61 |
| 3,422,164 | 1/1969 | Goldsby (III) | 260—683.62 |
| 3,448,168 | 6/1969 | Goldsby (IV) | 260—683.62 |

FOREIGN PATENTS 547,214  11/1940  Great Britain _____ 260—683.4

DELBERT E. GANTZ, Primary Examiner

G. J. CRASANAKIS, Assistant Examiner

U.S. Cl. X.R.

260—683.61